US 11,781,473 B2

(12) United States Patent
Okamoto et al.

(10) Patent No.: US 11,781,473 B2
(45) Date of Patent: Oct. 10, 2023

(54) TURBINE

(71) Applicant: IHI Corporation, Tokyo (JP)

(72) Inventors: Shun Okamoto, Tokyo (JP); Tomohiro Inoue, Tokyo (JP); Toshifumi Terui, Tokyo (JP); Isao Morita, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 17/807,587

(22) Filed: Jun. 17, 2022

(65) Prior Publication Data

US 2022/0316388 A1 Oct. 6, 2022

Related U.S. Application Data

(63) Continuation of application No. PCT/JP2020/047721, filed on Dec. 21, 2020.

(30) Foreign Application Priority Data

Apr. 1, 2020 (JP) .................... 2020-065877

(51) Int. Cl.
*F02B 37/18* (2006.01)
*F02B 37/02* (2006.01)
*F02B 39/16* (2006.01)

(52) U.S. Cl.
CPC .......... *F02B 37/183* (2013.01); *F02B 37/025* (2013.01); *F02B 39/16* (2013.01); *F05D 2220/40* (2013.01)

(58) Field of Classification Search
CPC ...... F02B 37/183; F02B 37/025; F02B 39/16; F05D 2220/40
See application file for complete search history.

(56) References Cited

U.S. PATENT DOCUMENTS

2009/0290980 A1   11/2009   Higashimori
2017/0022890 A1   1/2017    Chu et al.
(Continued)

FOREIGN PATENT DOCUMENTS

DE   10 2018 105 595 A1   5/2018
JP         56-175525 U    12/1981
(Continued)

OTHER PUBLICATIONS

International Search Report dated Feb. 16, 2021 in PCT/JP2020/047721, filed on Dec. 21, 2020, 3 pages.

*Primary Examiner* — Brandon D Lee
(74) *Attorney, Agent, or Firm* — Oblon, McClelland, Maier & Neustadt, L.L.P.

(57) ABSTRACT

A turbine includes: a housing including an accommodating portion accommodating a turbine impeller; a first turbine scroll flow path communicating with the accommodating portion; a second turbine scroll flow path communicating with the accommodating portion and having a volume larger than a volume of the first turbine scroll flow path; a valve seat having a first port and a second port, the first port communicating with the first turbine scroll flow path, the second port communicating with the second turbine scroll flow path and having an opening area smaller than an opening area of the first port; a valve configured to contact the valve seat; and a shaft holding the valve and arranged on a side opposite to the first port with respect to the second port.

4 Claims, 4 Drawing Sheets

(56) References Cited

U.S. PATENT DOCUMENTS

2018/0258817 A1    9/2018  Kosuge et al.
2020/0040812 A1*   2/2020  Morita .................. F01D 17/146

FOREIGN PATENT DOCUMENTS

| JP | 62-29723 A | 2/1987 |
| JP | 63-21 328 A | 1/1988 |
| JP | 63-17833 U | 2/1988 |
| JP | 1-174530 U | 12/1989 |
| JP | 1-179131 U | 12/1989 |
| JP | 2-41310 Y2 | 11/1990 |
| JP | 2006-348894 A | 12/2006 |
| JP | 2009-281197 A | 12/2009 |
| JP | 2013-2302 A | 1/2013 |
| JP | 2018-145914 A | 9/2018 |
| JP | 2018-150842 A | 9/2018 |
| JP | 2018-172989 A | 11/2018 |
| WO | WO 2018/151267 A1 | 8/2018 |

* cited by examiner

TURBINE

CROSS REFERENCE TO RELATED APPLICATIONS

This application is a continuation application of International Application No. PCT/JP2020/047721, filed on Dec. 21, 2020, which claims priority to Japanese Patent Application No. 2020-065877 filed on Apr. 1, 2020, the entire contents of which are incorporated herein by reference.

BACKGROUND ART

Technical Field

The present disclosure relates to a turbine.

A turbocharger includes a turbine. Some turbines include two turbine scroll flow paths. In Patent Literature 1, there is disclosed two wastegate ports communicating with two turbine scroll flow paths, respectively. In Patent Literature 1, there is disclosed a wastegate valve that opens and closes the two wastegate ports. In Patent Literature 1, there is a disclosure that the two wastegate ports are set to have substantially the same flow path area when the wastegate valve is opened.

CITATION LIST

Patent Literature

Patent Literature 1: JP 63-21328 A

SUMMARY OF INVENTION

Technical Problem

The two turbine scroll flow paths may have volumes (capacities) different from each other. In such case, between the two turbine scroll flow paths, a pressure of an exhaust gas in the turbine scroll flow path having a smaller volume is higher than a pressure of an exhaust gas in the turbine scroll flow path having a larger volume. When the wastegate valve is opened and the two wastegate ports have substantially the same flow path area, a difference between the pressures of the exhaust gases flowing through the two turbine scroll flow paths is not reduced, which may result in degradation of turbine performance.

An object of the present disclosure is to provide a turbine capable of preventing degradation of turbine performance.

Solution to Problem

In order to solve the above problem, a turbine according to one aspect of the present disclosure includes: a housing including an accommodating portion accommodating a turbine impeller; a first turbine scroll flow path communicating with the accommodating portion; a second turbine scroll flow path communicating with the accommodating portion and having a volume larger than a volume of the first turbine scroll flow path; a valve seat having a first port and a second port, the first port communicating with the first turbine scroll flow path, the second port communicating with the second turbine scroll flow path and having an opening area smaller than an opening area of the first port; a valve configured to contact the valve seat; and a shaft holding the valve and arranged on a side opposite to the first port with respect to the second port.

The shaft may include a rotation center axis extending in a direction crossing a connecting line direction that connects a center of the first port and a center of the second port.

A volume of an exhaust flow path from an engine through the first turbine scroll flow path to the turbine impeller may be smaller than a volume of an exhaust flow path from the engine through the second turbine scroll flow path to the turbine impeller.

Effects of Disclosure

According to the present disclosure, the degradation of the turbine performance can be prevented.

DESCRIPTION OF EMBODIMENT

Embodiments of the present disclosure will be described in detail below with reference to the accompanying drawings. Specific dimensions, materials, and numerical values described in the embodiments are merely examples for a better understanding, and do not limit the present disclosure unless otherwise specified. In this specification and the drawings, duplicate explanations are omitted for elements having substantially the same functions and configurations by assigning the same sign. Furthermore, elements not directly related to the present disclosure are omitted from the figures.

Figure 1:
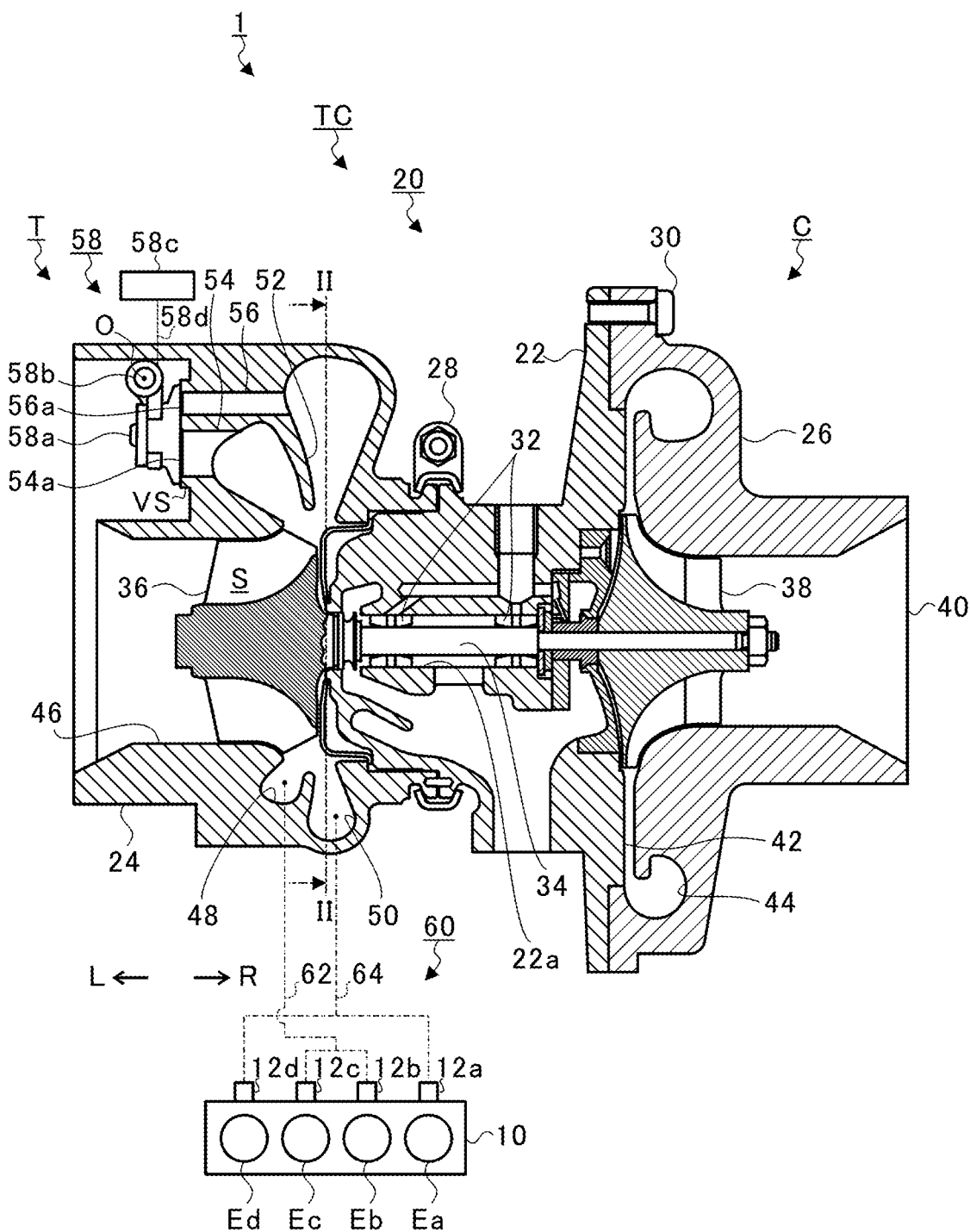
FIG. 1 is a schematic configuration view of an engine system 1.

FIG. 1 is a schematic configuration view of an engine system 1. As shown in FIG. 1, the engine system 1 includes an engine 10 and a turbocharger TC. Details of the engine 10 will be described later.

The turbocharger TC includes a turbocharger body 20. A direction indicated by an arrow L in FIG. 1 will be described as a left side of the turbocharger TC. A direction indicated by an arrow R in FIG. 1 will be described as a right side of the turbocharger TC. The turbocharger body 20 includes a bearing housing 22, a turbine housing (housing) 24, and a compressor housing 26.

The turbine housing 24 is coupled to the left side of the bearing housing 22 by a fastening mechanism 28. The fastening mechanism 28 includes, for example, a G-coupling. The bearing housing 22 and the turbine housing 24 are band-fastened by the fastening mechanism 28. The compressor housing 26 is coupled to the right side of the bearing housing 22 by a fastening bolt 30. In the turbocharger TC, a part including the turbine housing 24 functions as a turbine T. In the turbocharger TC, a part including the compressor housing 26 functions as a compressor C.

An accommodation hole 22a is formed in the bearing housing 22. The accommodation hole 22a passes through the bearing housing 22 in the left-to-right direction of the turbocharger TC. Bearings 32 are arranged in the accommodation hole 22a. In FIG. 1, full floating bearings are illustrated as an example of the bearings 32. However, the bearings 32 may be other radial bearings such as semifloating bearings or rolling bearings. A part of a shaft 34 is arranged in the accommodation hole 22*a*. The shaft 34 is rotatably supported by the bearings 32. A turbine impeller 36 is provided at a left end of the shaft 34. The turbine impeller 36 is rotatably accommodated in the turbine housing 24. A compressor impeller 38 is provided at a right end of the shaft 34. The compressor impeller 38 is rotatably accommodated in the compressor housing 26.

An inlet 40 is formed in the compressor housing 26. The inlet 40 opens to the right side of the turbocharger TC. The inlet 40 is connected to an air cleaner (not shown). A diffuser flow path 42 is defined between the bearing housing 22 and the compressor housing 26. The diffuser flow path 42 pressurizes air. The diffuser flow path 42 has an annular shape extending from an inner side toward an outer side in a radial direction of the shaft 34 (hereinafter simply referred to as "radial direction"). The diffuser flow path 42 communicates with the inlet 40 via the compressor impeller 38 at an radially inner part.

Furthermore, a compressor scroll flow path 44 is formed in the compressor housing 26. The compressor scroll flow path 44 has an annular shape. The compressor scroll flow path 44 is located, for example, radially outside the compressor impeller 38. The compressor scroll flow path 44 communicates with an intake port (not shown) of the engine 10 and the diffuser flow path 42. When the compressor impeller 38 rotates, the air is sucked from the inlet 40 into the compressor housing 26. The intake air is pressurized and accelerated while passing through blades of the compressor impeller 38. The pressurized and accelerated air is further pressurized in the diffuser flow path 42 and the compressor scroll flow path 44. The pressurized air flows out from a discharge port (not shown) and is led to the intake port of the engine 10.

A discharge flow path 46 is formed in the turbine housing 24. The discharge flow path 46 opens to the left side of the turbocharger TC. The discharge flow path 46 is connected to an exhaust gas purification device (not shown). An accommodating portion S that accommodates the turbine impeller 36 is formed in the turbine housing 24. The accommodating portion S is located upstream of the discharge flow path 46 (right side in FIG. 1). The accommodating portion S communicates with the discharge flow path 46. The discharge flow path 46 extends in a rotational axis direction of the turbine impeller 36 (hereinafter also simply referred to as "rotational axis direction").

A first turbine scroll flow path 48 and a second turbine scroll flow path 50 are formed in the turbine housing 24. The first turbine scroll flow path 48 and the second turbine scroll flow path 50 are located radially outside the accommodating portion S. The first turbine scroll flow path 48 and the second turbine scroll flow path 50 communicate with the accommodating portion S.

As shown in FIG. 1, a flow-path sectional area of the second turbine scroll flow path 50 is larger than a flow-path sectional area of the first turbine scroll flow path 48. Thus, a volume (capacity) of the second turbine scroll flow path 50 is larger than a volume (capacity) of the first turbine scroll flow path 48. However, the flow-path sectional areas of the first turbine scroll flow path 48 and the second turbine scroll flow path 50 are not limited thereto, and the flow-path sectional area of the first turbine scroll flow path 48 may be larger than the flow-path sectional area of the second turbine scroll flow path 50. That is, the volume (capacity) of the first turbine scroll flow path 48 may be larger than the volume (capacity) of the second turbine scroll flow path 50.

The first turbine scroll flow path 48 and the second turbine scroll flow path 50 are arranged side by side in an axial direction. The second turbine scroll flow path 50 is located closer to the bearing housing 22 with respect to the first turbine scroll flow path 48. A partition wall 52 is formed between the first turbine scroll flow path 48 and the second turbine scroll flow path 50. The partition wall 52 separates the first turbine scroll flow path 48 and the second turbine scroll flow path 50 from each other in the axial direction.

The turbine housing 24 is provided with a first bypass flow path 54, a second bypass flow path 56, and a valve mechanism 58. The first bypass flow path 54 communicates with the first turbine scroll flow path 48 at one end, and has a first wastegate port (first port) 54*a* at the other end. The second bypass flow path 56 communicates with the second turbine scroll flow path 50 at one end, and has a second wastegate port (second port) 56*a* at the other end. Furthermore, the turbine housing 24 includes a valve seat VS where the first wastegate port 54*a* and the second wastegate port 56*a* are opened.

The valve mechanism 58 includes a wastegate valve (valve) 58*a*, a shaft 58*b*, and an actuator 58*c*. The wastegate valve 58*a* is configured to contact the valve seat VS, and can contact or be spaced apart from the valve seat VS. When the wastegate valve 58*a* is in contact with the valve seat VS, the first wastegate port 54*a* and the second wastegate port 56*a* are closed. When the wastegate valve 58*a* is spaced apart from the valve seat VS, the first wastegate port 54*a* and the second wastegate port 56*a* are opened.

The shaft 58*b* is connected to the wastegate valve 58*a* to hold the wastegate valve 58*a*. The shaft 58*b* is supported by a bush (not shown) so as to be rotatable around a rotation center axis O.

The actuator 58*c* rotates the shaft 58*b* via a link mechanism 58*d* (indicated by a broken line in FIG. 1). When the shaft 58*b* is rotated by the actuator 58*c*, the wastegate valve 58*a* is moved in a direction approaching or spaced apart from the valve seat VS.

The engine 10 includes a first cylinder Ea, a second cylinder Eb, a third cylinder Ec, and a fourth cylinder Ed. In each of the cylinders Ea, Eb, Ec, and Ed, an air-fuel mixture supplied via the compressor C is combusted. Combustion timings in the cylinders Ea, Eb, Ec, and Ed are different from each other. For example, the combustion is set to occur in the order of the first cylinder Ea, the third cylinder Eb, the fourth cylinder Ed, and the second cylinder Eb. An exhaust gas generated by the combustion of the air-fuel mixture is discharged from exhaust ports 12*a*, 12*b*, 12*c*, and 12*d* of the cylinders Ea, Eb, Ec, and Ed, respectively. In this embodiment, description is given of an example in which the engine 10 includes four cylinders. However, the number of cylinders is not limited thereto, and the engine 10 may include, for example, six cylinders.

An exhaust manifold 60 is provided between the turbine housing 24 and the engine 10. The exhaust manifold 60 connects the engine 10 and the turbine housing 24 to each other.

A first merging path 62 (indicated by a long dashed double-short dashed line in FIG. 1) and a second merging path 64 (indicated by a long dashed double-short dashed line in FIG. 1) are formed in the exhaust manifold 60. The first merging path 62 communicates with the exhaust port (first exhaust port) 12*b* of the second cylinder Eb and the exhaust port (first exhaust port) 12*c* of the third cylinder Ec. Furthermore, the first merging path 62 communicates with the first turbine scroll flow path 48 of the turbine housing 24. The first merging path 62 allows the exhaust gases discharged from the second cylinder Eb and the third cylinder Ec via the exhaust ports 12b and 12c to merge, and leads the exhaust gas to the first turbine scroll flow path 48.

The second merging path 64 communicates with the exhaust port (second exhaust port) 12a of the first cylinder Ea and the exhaust port (second exhaust port) 12d of the fourth cylinder Ed. Furthermore, the second merging path 64 communicates with the second turbine scroll flow path 50 of the turbine housing 24. The second merging path 64 allows the exhaust gases discharged from the first cylinder Ea and the fourth cylinder Ed via the exhaust ports 12a and 12d to merge, and leads the exhaust gas to the second turbine scroll flow path 50.

The first merging path 62 is connected to two cylinders Eb and Ec that are arranged on an inner side among the cylinders Ea, Eb, Ec, and Ed of the engine 10. Furthermore, the second merging path 64 is connected to two cylinders Ea and Ed that are arranged on an outer side among the cylinders Ea, Eb, Ec, and Ed of the engine 10. Thus, the second merging path 64 has a larger flow path length than a flow path length of the first merging path 62. Thus, the second merging path 64 has a larger volume than a volume of the first merging path 62. However, the arrangement and structures of the first merging path 62 and the second merging path 64 are not limited thereto, and the first merging path 62 may be connected to the two cylinders Ea and Ed arranged on the outer side, and the second merging path 64 may be connected to the two cylinders Eb and Ec arranged on the inner side, for example. That is, the volume of the first merging path 62 may be larger than the volume of the second merging path 64.

The exhaust gases led into the first turbine scroll flow path 48 and the second turbine scroll flow path 50 are led to the discharge flow path 46 through blades of the turbine impeller 36. The exhaust gases rotate the turbine impeller 36 while passing therethrough.

A rotational force of the turbine impeller 36 is transmitted to the compressor impeller 38 via the shaft 34. As described above, air is pressurized by the rotational force of the compressor impeller 38, and is then led to the intake port of the engine 10.

Figure 2:
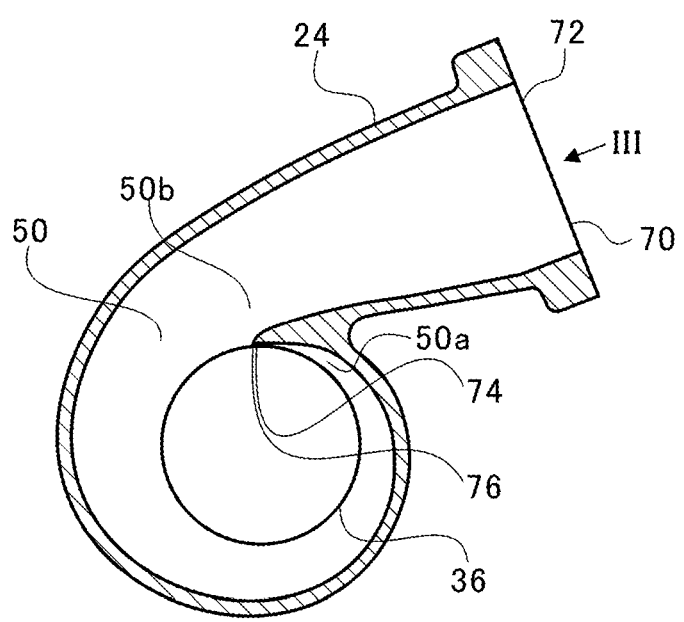
FIG. 2 is a sectional view taken along the line II-II in FIG. 1.
Figure 3:
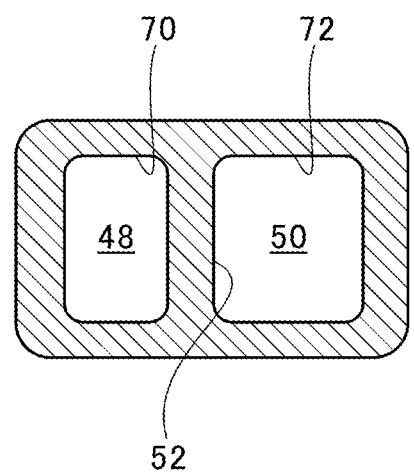
FIG. 3 is a view seen in a direction of an arrow III in FIG. 2.

FIG. 2 is a sectional view taken along the line II-II in FIG. 1. FIG. 2 is a sectional view of the turbine housing 24 taken along the plane perpendicular to an axial direction of the shaft 34 and passing across the second turbine scroll flow path 50. In FIG. 2, a first gas inflow port 70 and a second gas inflow port 72 (described later) are illustrated in an overlapping manner. Furthermore, in FIG. 2, the turbine impeller 36 is represented by a circle. FIG. 3 is a view seen in a direction of an arrow III in FIG. 2.

As shown in FIG. 2 and FIG. 3, the first gas inflow port 70 and the second gas inflow port 72 are formed in the turbine housing 24. The first gas inflow port 70 and the second gas inflow port 72 open to an outside of the turbine housing 24. The first merging path 62 is connected to the first gas inflow port 70. The first gas inflow port 70 connects the first merging path 62 to the first turbine scroll flow path 48. The second merging path 64 is connected to the second gas inflow port 72. The second gas inflow port 72 connects the second merging path 64 to the second turbine scroll flow path 50.

As shown in FIG. 3, an opening area of the first gas inflow port 70 is smaller than an opening area of the second gas inflow port 72. As shown in FIG. 2, two tongue portions 74 and 76 are formed in the turbine housing 24. In FIG. 2, the two tongue portions 74 and 76 are illustrated in an overlapping manner. The tongue portion 76 is provided in a downstream section 50a of the second turbine scroll flow path 50. The tongue portion 76 separates the downstream section 50a and an upstream section 50b of the second turbine scroll flow path 50 from each other. Similarly to the tongue portion 76, the tongue portion 74 is provided in a downstream section of the first turbine scroll flow path 48, and separates the downstream section and an upstream section from each other.

Positions of the two tongue portions 74 and 76 are the same in a rotating direction of the turbine impeller 36. As can be seen, the turbine T is a so-called twin scroll turbine.

As described above, the turbine T according to this embodiment includes two turbine scroll flow paths having different volumes. When the two turbine scroll flow paths have different volumes, a pressure of an exhaust gas in the turbine scroll flow path having a smaller volume is higher than a pressure of an exhaust gas in the turbine scroll flow path having a larger volume, between the two turbine scroll flow paths.

In this embodiment, a volume of the first turbine scroll flow path 48 is smaller than a volume of the second turbine scroll flow path 50. Thus, a pressure of an exhaust gas in the first turbine scroll flow path 48 is higher than a pressure of an exhaust gas in the second turbine scroll flow path 50.

When the wastegate valve 58a is spaced apart from the valve seat VS to open the two wastegate ports 54a and 56a, the exhaust gases flow out from the two wastegate ports 54a and 56a. The exhaust gases flowing out from the two wastegate ports 54a and 56a bypass the turbine impeller 36 to be discharged to the discharge flow path 46. At this state, when the two wastegate ports 54a and 56a are set to have substantially the same passage area, a difference between the pressures of the exhaust gases flowing through the two turbine scroll flow paths 48 and 50 is not reduced, which may result in degradation of turbine performance. In general, as a pressure (pressure of the exhaust gas) applied to the turbine impeller 36 becomes more uniform, the turbine performance is further improved.

Figure 4:
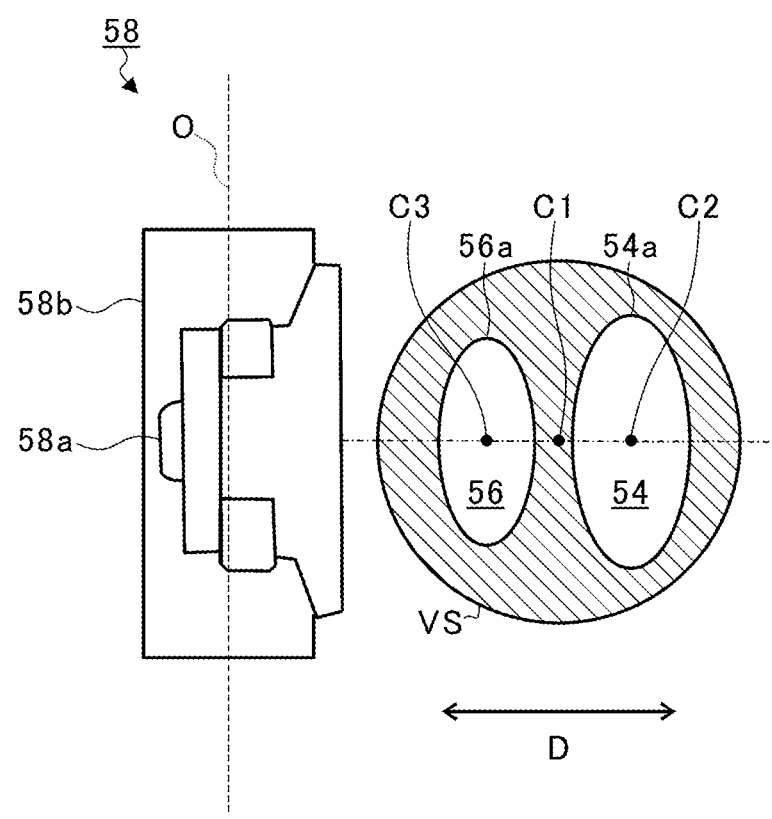
FIG. 4 is an illustration of an arrangement relationship between a valve seat and a valve mechanism according to an embodiment.

FIG. 4 is an illustration of an arrangement relationship between the valve seat VS and the valve mechanism 58 according to an embodiment. As shown in FIG. 4, a flow-path sectional area of the first bypass flow path 54 is larger than a flow-path sectional area of the second bypass flow path 56. In other words, the flow-path sectional area of the second bypass flow path 56 is smaller than the flow-path sectional area of the first bypass flow path 54.

Furthermore, an opening area of the first wastegate port 54a is larger than an opening area of the second wastegate port 56a. In other words, the opening area of the second wastegate port 56a is smaller than the opening area of the first wastegate port 54a.

The shaft 58b is arranged closer to the second wastegate port 56a with respect to a center C1 of the valve seat VS. The shaft 58b is arranged on a side opposite to the first wastegate port 54a with respect to the second wastegate port 56a. The shaft 58b has the rotation center axis O extending in a direction crossing an arrangement direction in which the first wastegate port 54a and the second wastegate port 56a are arranged side by side. More specifically, the shaft 58b has the rotation center axis O extending in a direction crossing a connecting line direction D that connects a center C2 of the first wastegate port 54a and a center C3 of the second wastegate port 56a. In this embodiment, the shaft 58b has the rotation center axis O extending in the direction crossing the connecting line direction D that connects the center C1 of the valve seat, the center C2 of the first wastegate port 54a, and the center C3 of the second wastegate port 56a. In this embodiment, the direction in which the rotation center axis O extends is orthogonal to the connecting line direction D (arrangement direction).

This arrangement allows opening timings of the first wastegate port 54a and the second wastegate port 56a to be set different from each other. That is, the wastegate valve 58a does not open the first wastegate port 54a and the second wastegate port 56a at the same time. Furthermore, a distance from the rotation center axis O to the second wastegate port 56a and a distance from the rotation center axis O to the first wastegate port 54a may be set different from each other. In this embodiment, the distance from the rotation center axis O to the first wastegate port 54a is larger than the distance from the rotation center axis O to the second wastegate port 56a.

Thus, when the shaft 58b rotates in a direction separating the wastegate valve 58a away from the valve seat VS, the wastegate valve 58a opens the first wastegate port 54a before opening the second wastegate port 56a. In this manner, the wastegate valve 58a can control flow rates so that a flow rate from the first wastegate port 54a is larger than a flow rate from the second wastegate port 56a.

Furthermore, as described above, the opening area of the first wastegate port 54a is larger than the opening area of the second wastegate port 56a. Thus, when the first wastegate port 54a and the second wastegate port 56a are opened, a flow rate of the exhaust gas flowing out from the first wastegate port 54a is larger than a flow rate of the exhaust gas flowing out from the second wastegate port 56a.

Furthermore, as described above, the first wastegate port 54a communicates with the first turbine scroll flow path 48, and the second wastegate port 56a communicates with the second turbine scroll flow path 50. The volume of the first turbine scroll flow path 48 is smaller than the volume of the second turbine scroll flow path 50. Thus, the pressure of the exhaust gas in the first turbine scroll flow path 48 is higher than the pressure of the exhaust gas in the second turbine scroll flow path 50.

The first wastegate port 54a can discharge a larger amount of exhaust gas through the first turbine scroll flow path 48 than the amount of exhaust gas discharged through the second turbine scroll flow path 50 by the second wastegate port 56a. Thus, a difference between the pressures of the exhaust gases flowing through the two turbine scroll flow paths 48 and 50 can be reduced to thereby prevent the degradation of turbine performance.

Furthermore, as described above, the volume of the second merging path 64 in the exhaust manifold 60 is larger than the volume of the first merging path 62. The first merging path 62 communicates with the first turbine scroll flow path 48, and the second merging path 64 communicates with the second turbine scroll flow path 50. Thus, a volume of an exhaust flow path corresponding to a combination of the first merging path 62 and the first turbine scroll flow path 48 is smaller than a volume of an exhaust flow path corresponding to a combination of the second merging path 64 and the second turbine scroll flow path 50. That is, the volume of the exhaust flow path from the engine 10 through the first turbine scroll flow path 48 to the turbine impeller 36 is smaller than the volume of the exhaust flow path from the engine 10 through the second turbine scroll flow path 50 to the turbine impeller 36.

Thus, a pressure in the exhaust flow path corresponding to the combination of the first merging path 62 and the first turbine scroll flow path 48 is larger than a pressure in the exhaust flow path corresponding to the combination of the second merging path 64 and the second turbine scroll flow path 50.

In this embodiment, the first wastegate port 54a communicates with the exhaust flow path having a smaller volume between the two exhaust flow paths having a volume difference, and the second wastegate port 56a communicates with the exhaust flow path having a larger volume between the two exhaust flow paths. That is, between the combination of the first merging path 62 and the first turbine scroll flow path 48 and the combination of the second merging path 64 and the second turbine scroll flow path 50, one having a smaller volume communicates with the first wastegate port 54a having a larger opening area. The first wastegate port 54a can discharge a larger amount of exhaust gas through the exhaust flow path having a smaller volume than the amount of exhaust gas discharged by the second wastegate port 56a. Thus, a difference between the pressures of the exhaust gases flowing through the two exhaust flow paths can be reduced to thereby prevent the degradation of turbine performance.

Although the embodiments of the present disclosure have been described above with reference to the accompanying drawings, the present disclosure is not limited thereto. It is obvious that a person skilled in the art can conceive of various examples of variations or modifications within the scope of the claims, which are also understood to belong to the technical scope of the present disclosure.

In the above embodiment, the turbine T of the turbocharger TC has been described as an example. However, a turbine T built into a device other than the turbocharger TC or a turbine T as a single separate body may be used.

In the above embodiment, the twin scroll turbine including the first turbine scroll flow path 48 and the second turbine scroll flow path 50 that are separated in the axial direction has been described. However, the present disclosure is not limited thereto, and the turbine T may be a double scroll turbine including a first turbine scroll flow path 48 and a second turbine scroll flow path 50 that are separated in a radial direction and including two tongue portions 74 and 76 that are positioned so that their phases are different from each other by about 180 degrees.

In the above embodiment, the first merging path 62 communicating with the first turbine scroll flow path 48 and the second merging path 64 merging with the second turbine scroll flow path 50 have been described as an example. However, the present disclosure is not limited thereto, and the first merging path 62 may communicate with the second turbine scroll flow path 50, and the second merging path 64 may communicate with the first turbine scroll flow path 48.

What is claimed is:
1. A turbine, comprising:
a housing including an accommodating portion accommodating a turbine impeller;
a first turbine scroll flow path communicating with the accommodating portion;
a second turbine scroll flow path communicating with the accommodating portion and having a volume larger than a volume of the first turbine scroll flow path;
a valve seat having a first port and a second port, the first port communicating with the first turbine scroll flow path, the second port communicating with the second turbine scroll flow path and having an opening area smaller than an opening area of the first port;
a valve configured to contact the valve seat; and
a shaft holding the valve and arranged on a side opposite to the first port with respect to the second port.

2. The turbine according to claim 1, wherein the shaft includes a rotation center axis extending in a direction crossing a connecting line direction that connects a center of the first port and a center of the second port.

3. The turbine according to claim 1, wherein a volume of an exhaust flow path from an engine through the first turbine scroll flow path to the turbine impeller is smaller than a volume of an exhaust flow path from the engine through the second turbine scroll flow path to the turbine impeller.

4. The turbine according to claim 2, wherein a volume of an exhaust flow path from an engine through the first turbine scroll flow path to the turbine impeller is smaller than a volume of an exhaust flow path from the engine through the second turbine scroll flow path to the turbine impeller.

\* \* \* \* \*